United States Patent [19]

Ball

[11] E Re. 28,751

[45] Reissued Mar. 30, 1976

[54] X- AND GAMMA-RAY SENSITIVE IMAGE INTENSIFICATION TUBE

[75] Inventor: Jack Ball, Chesterland, Ohio

[73] Assignee: Varian Associates, Palo Alto, Calif.

[22] Filed: Oct. 17, 1973

[21] Appl. No.: 407,076

Related U.S. Patent Documents

Reissue of:

[64] Patent No.: 3,558,893
Issued: Jan. 26, 1971
Appl. No.: 612,629
Filed: Jan. 30, 1967

[52] U.S. Cl. ..... 250/213 VT; 313/373; 250/361; 29/572

[51] Int. Cl.[2] ..... H01J 31/50

[58] Field of Search.. 250/213 VT, 213 R, 361–363, 250/368, 369; 313/65 R, 65 LF, 101, 94, 373, 380; 29/572, 581, 582, 25.17, 25.18; 117/33.5 C

[56] References Cited

UNITED STATES PATENTS

| | | | |
|---|---|---|---|
| 2,585,551 | 2/1952 | Hofstader | 252/301.4 R X |
| 2,692,948 | 10/1954 | Lion | 250/211 R X |
| 2,699,511 | 1/1955 | Sheldon | 250/213 VT X |
| 3,213,308 | 10/1965 | Feibelman | 313/65 R |
| 3,356,851 | 12/1967 | Carlson | 250/213 VT |
| 3,373,279 | 3/1968 | Hofstader | 252/301.4 R X |

FOREIGN PATENTS OR APPLICATIONS

| | | | |
|---|---|---|---|
| 747,855 | 4/1956 | United Kingdom | 250/213 VT |
| 716,064 | 9/1954 | United Kingdom | 250/213 VT |

OTHER PUBLICATIONS

Albrecht et al.: X-Ray Screens with Reduced Information Losses; 5 Media Mundi, pp. 80–84; 1959.

*Primary Examiner*—Walter Stolwein
*Attorney, Agent, or Firm*—Stanley Z. Cole; David Roy Pressman; Thomas E. Fisher

[57] ABSTRACT

The invention relates to an X- and Gamma-ray sensitive image intensification tube for use in a so-called gamma camera or the like, which tube preferably has a single crystal input phosphor.

12 Claims, 1 Drawing Figure

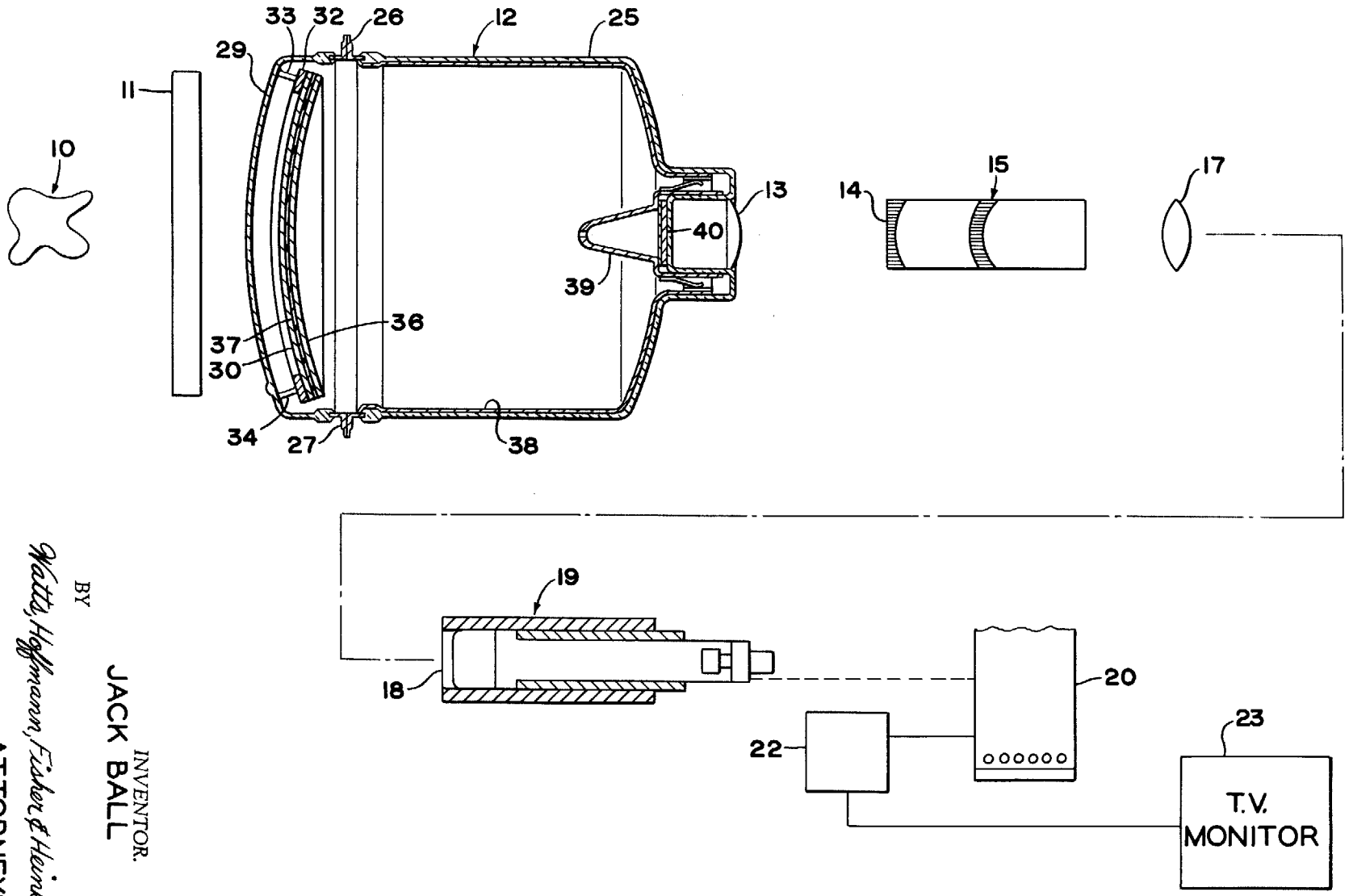
INVENTOR.
JACK BALL
BY
Watts, Hoffmann, Fisher & Heinke
ATTORNEYS

X- AND GAMMA-RAY SENSITIVE IMAGE INTENSIFICATION TUBE

Matter enclosed in heavy brackets [ ] appears in the original patent but forms no part of this reissue specification; matter printed in italics indicates the additions made by reissue.

CROSS REFERENCES TO RELATED APPLICATIONS

1. Application Ser. No. 578,617, filed Sept. 12, 1966, by Carl W. Hansen under the title "Method and Apparatus for Producing an Amplified Image of the Distribution of Gamma Radiation or the Like."

2. Application Ser. No. 594,083, filed Nov. 14, 1966, now U.S. Pat. No. 3,543,384, by Carl W. Hansen under the title "Collimators and Methods of Collimator Fabrication."

BACKGROUND OF THE INVENTION

1. Field of the Invention

Radioactive isotopes are used in a variety of medical diagnostic techniques. With some of these techniques, a radioactive isotope is administered to the patient. Later, a study is made of the distribution and concentration of the isotope in the patient. This type of study is of benefit in diagnosing tumors and other ailments.

Prior to this invention and the gamma camera of the first referenced copending application, scintillation scanners were used in the usual techniques employed for the visualization of the spatial distribution of the radioactive material selectively absorbed in the tissues of the subject. In the usual scintillation scanning technique, a scintillation probe is moved along a series of parallel paths over the portion of the subject's anatomy that is being studied. Radiation from an administered radioactive isotope causes the probe to impart electrical impulses to a recording apparatus. This recording apparatus produces a graphic image of the spatial distribution of detected radiation. Typically, images are produced on paper by various types of recorders and on film by techniques known in the art such as those disclosed in U.S. Letters Pat. No. 3,159,744, entitled "Scintillation Scanner Photorecording Circuit" and U.S. Letters Pat. No. RE 26,014 entitled "Scintillation Scanner."

Because the probe is moved along these parallel paths, the time for conducting a complete scan is relatively long which results in a number of disadvantages. These include:

1. Relatively few patients may be examined with one apparatus;

2. The protracted period of time required results in discomfort of the patient; and 3. The image does not show the total distribution of radioactive substance in the subject matter at any one time.

Another type of proposed image system is sometimes referred to as a stationary scanner. This scanner uses a matrix of scintillators positioned over the area to be studied. Each scintillator within the matrix is associated with a specific location in the area to be studied. Light impulses generated by different scintillators in the matrix are read out by photomultiplier tubes. Impulses emitted by these tubes may then be used to reproduce the image formed by the radiation in a manner similar to that used in the scanning system described in the referenced patents. Although the matrix system is faster than scanning methods prior to it, the system is limited by the number of scintillators and photomultiplier tubes which can practically be used. Accordingly, resolution is poor.

A variation of the scanner using a matrix of scintillators is one with a scintillator positioned behind an apertured collimator. A plurality of photomultiplier tubes are positioned on the side of the scintillator opposite the collimator. Each time the scintillation appears on the scintillator it is viewed by a plurality of the photomultiplier tubes. The resulting impulses from the photomultiplier tubes are passed through a computer which determines the spatial location of the scintillation on the scintillator according to the relative strengths of the plurality of electrical pulses resulting from the scintillation. A graphic reproduction of the scintillations is then produced on the oscilloscope. Such devices are obviously complex and susceptible to some error due to variations such as from one multiplier tube to another. The spatial location of each scintillation is uncertain because of the poor statistical accuracy of each electrical signal. For these and other reasons such devices tend to fail to accurately demonstrate the true spatial distribution of radioactivity in the subject under study.

In the first referenced, copending application, another type of stationary scanner known as a gamma camera is described. There an image intensification tube is stimulated by photons emitted by the radioactive material administered to the patient. The image tube has an input phosphor which is stimulated by these photons and which emits light in response to them. The light emitted by the input phosphor stimulates an electroluminescent layer which emits electrons. These electrons are accelerated electronically against an output phosphor. The intensified image produced by the output phosphor then passes through a light amplification stage into a closed-circuit television system.

2. Description of the Prior Art

Image tubes in the prior art generally comprise an evacuated envelope with an input "sandwich" at one end of the tube, an output phosphor at the other end, and a means to electronically accelerate electrons emitted by the sandwich against the output phosphor.

This input sandwich typically includes a dishlike aluminum member which serves multiple purpose of: (1) filtering the input energy; (2) preventing external light from stimulating the input phosphor; (3) mechanically supporting the balance of the sandwich; and (4) a physical barrier against migration of molecules from the front of the input phosphor layer into the vacuum within the envelope.

The typical input phosphor is made up of many discrete particles of a phosphorescent material admixed in a suitable bonding and sealing vehicle such as an epoxy resin material. This admixture forms a slurry which is deposited in a thin layer on the inner surface of the aluminum dish to provide a phosphorescent layer of substantially uniform thickness with the phosphorescent material sealed off by the bonding agent or other barrier layer to prevent its migration into an electron-emissive layer or into the vacuum in the tube.

An electron-emissive layer is then deposited on this input phosphor and barrier layer. Typically, a microscopically thin film of metal will be interposed between the barrier layer and the electron-emissive layer to provide replenishment of electrons for the emissive layer. The metal layer is microscopically thin so that it does not materially inhibit the passage of light from the phosphor layer to the electron-emissive layer.

Electrons emitted by the emissive layer are accelerated by a suitable means such as electrostatic rings or a metal "jacket" which surrounds the acceleration path and which carries an electrical charge.

While image tubes of this type have been satisfactory for so-called bright fluoroscopic studies where an X-ray source provides the stimulating energy they severely limit the use of a gamma camera, especially when that gamma camera is utilized for conducting medical studies on human beings.

One reason image tubes of this type have limited the use of gamma cameras is that they have a very low so-called conversion efficiency. That is, a relatively low percentage of photons of energy entering the image tube are actually converted to light signals. One reason for this is that the typical input phosphor is relatively thin and much of the gamma energy passes through the phosphor without causing the emission of light.

The expedient of making the input phosphor thicker by prior known techniques has not been a satisfactory solution for gamma cameras. One reason it has not been a satisfactory solution is that each phosphorescent particle used to build up a fluorescent screen by this described technique has reflective surfaces. When enough particles are used to make a screen of a thickness which is efficient in converting the input energy to light, there are many reflective surfaces. Because there are so many surfaces, the stimulated light may reach the electron-emissive layer at a location which is, in a plane parallel to the plane of the input phosphor, a substantial distance from its source.

Obviously, this diversion of light will result in very poor resolution with the result that a produced graphic image will not provide an accurate indication of the true spatial distribution of the isotope in the subject under investigation.

While it has been known that halogens are efficient phosphors, they have not been accepted for use in image intensification tubes and the like because the halogens tend to disassociate relatively easily. This is especially true with iodides. A disassociated halogen atom tends to "poison" the vacuum by chemically interacting with the photo cathode; i.e., the electron-emissive layer, and even the output phosphor to cause deleterious effects and early tube failure.

Another problem has been how one can provide an input phosphor of the size requisite for a gamma camera or the like which produces accurate and dependable results with the relatively low stimulating energy available from a radioactive isotope. The above-described input phosphor layer is in reality a mosaic of discrete phosphorescent particles. Proposals have been made to develop a mosaic of larger pieces by adhering together a series of relative large crystals. According to these proposals, the crystals in the mosaic are positioned and adhered in a dishlike configuration which is generally parabolic in shape in order for the input "sandwich" to be focused relative to the electron accelerating field. These proposals also call for encapsulation of the mosaic to prevent poisoning of the image tube.

One major shortcoming of any mosaic is the conversion efficiency of each element of the mosaic is different from the others. The result is that a given light output of one crystal of the mosaic is not reflective of the same amount of incident energy as is the same light output from another crystal of the mosaic. This is true even where all crystals of the mosaic are cut from the same original crystal. The reason this is true is that the surfaces on each crystal cleaved from the large crystal is different from the surfaces on the other crystals, with different reflective indices. This results in a different light output in one crystal as compared to another for any given amount of incident energy.

SUMMARY OF THE INVENTION

It has been discovered that all of the above-described difficulties can be overcome and that it is possible to produce an image tube with good resolution in which there is conversion of a high percentage of input gamma photons to light. This is accomplished through the provision of an input phosphor which;

1. Is transparent to its own light.
2. Is a good absorber of the ray energy to which it is exposed;
3. Is photoluminescent;
4. Mates well chemically with the electron layer such as the well-known layer sold commercially under the designations S-11 (monoalkalis) and S-20 (trialkalis). Present preference, based on test data available and because of its stability and efficiency is S-20 which is a trialkali of antimony and three alkaline metals, potassium, sodium and cesium, which have been simultaneously vaccum-deposited in place;
5. Emits light energy which stimulates the electron layer efficiently and thus the phosphor must mate well in terms of the level of its light energy with the electron-emissive layer;
6. Is capable of being made into a dish shape so that the emitted electrons are focused with respect to the accelerating field;
7. Withstands the vacuum well without poisoning the interior of the image tube;
8. Withstands bake-out temperatures used to clean the tube before it is sealed without distortion or other degradation of the crystal. Typical bake-out temperatures may be as high as 300°F.; and
9. Is a unitary sheet with uniform energy converting properties over its entire area and preferably a single crystal. This permits the phosphor to be considerably thicker (i.e. .060 inch) than the prior art while reasonably good resolution is maintained. The increased thickness and absorption coact to produce a phosphor that is preferably capable of absorbing about 30 percent of gamma energy emitted by a 150 kev. (kiloelectron volts) source and proportional percentages of other so-called low energy isotopes, as compared with the 3 percent at 150 kev. on a typical prior phosphor. As used here, the term "low energy" means 250 kev., or less.

It has been discovered that cesium iodide is ideal for this purpose, fits all of these criteria, and does not, as has been feared with respect to all halogens, poison the tube. In fact, the requirements for physical barriers to prevent migration of molecules within the tube are actually reduced as compared with conventional prior art phosphors such as zinc cadmium sulfide which has most commonly been employed in the prior art. This further improves the performance of the tube, especially as compared with prior art devices that employed glass as a barrier layer, because energy losses due to absorption of violet and ultraviolet light by the barrier are substantially if not completely eliminated.

Rolled sheets of cesium iodide are available which, although in reality a type of mosaic, are unitary sheets which produce improved results. The best results, however, are obtained with a single crystal of cesium iodide which is transparent as compared to the somewhat yellow color of the rolled sheet and which has uniform light converting efficiency throughout. Thus, a single crystal of cesium iodide fits all of the above criteria.

A limited number of additional phosphors substantially fit these criteria generally but provide other disadvantages. For example, sodium iodide is available in large single crystals but to provide the dishlike shape it must be machined as compared with cesium iodide which may be heat softened and molded. Further, sodium iodide is highly hygroscopic and therefore must be dried and sealed carefully. Further, it is so active chemically that it must be isolated carefully within a surrounding vacuum envelope. Potassium iodide, while not of the hygroscopic nature of sodium iodide, has, in other respects, the same drawbacks as sodium iodide. These phosphors which achieve the criterion set out above and are utilized with the present invention may be collectively referred to as single crystalline sheets. Thus, as used herein the term "single crystalline" encompasses the described unitary sheets such as the described roll sheet of cesium iodide and the described single crystals as distinguished from prior image tube input screens such as those made up of small particles adhered in place with an epoxy adhesive.

Accordingly, the object of this invention is to provide a novel and improved gamma camera and more particularly a novel and improved image intensification tube which is especially suited for use in a gamma camera.

Other objects and a fuller understanding of the invention may be had by referring to the following description and claims taken in conjunction with the accompanying drawing.

DESCRIPTION OF THE DRAWING

The drawing is a schematic representation of a gamma camera including the improved image tube with the image tube being shown in cross section.

DESCRIPTION OF THE PREFERRED EMBODIMENTS

Referring now to the drawing, a subject under investigation is shown generally at 10. The subject, in the case of a medical study, might for example be a thyroid gland. With a gamma camera, the administered isotope is preferably a so-called low energy isotope, such as iodine 125.

Gamma radiation emitted by the source 10 passes through a parallel hole collimator indicated diagrammatically at 11. Preferably, the collimator is of the type described in the second above-referenced copending application. After the gamma radiation passes through the collimator 11, it enters an image tube shown generally at 12. The image tube will be described in greater detail below.

The output of the image tube 12 is focused by a suitable optical lens 13 onto input end 14 of a light amplifier 15. The diagrammatically disclosed light amplifier 15 is a two-stage amplifier. Because of the very high efficiency of the image tube of this invention, in many studies the light amplifier may be single stage or eliminated entirely. The output of the amplifier passes through a further optical lens 17 which focuses the light amplifier output onto input end 18 of a television pickup tube 19. The disclosed pickup tube 19 is an orthicon connected to an orthicon chain 20. The orthicon chain includes the usual video amplifier and sync and blanking generators.

The output of the orthicon chain 20 may be transmitted to a storage device 22 and then to a television monitor 23. The components of this structure which converts the light output of the image tube to an image tube on the television monitor and other suitable allied structure is disclosed in a more detailed manner in the first referenced copending application.

The image tube 12 includes a typical glass envelope 25 composed of two sections clamped together at 26, 27. The glass envelope is equipped with vacuum nipples, not shown which, in manufacture, are used to evacuate the tube and then sealed. The glass envelope 25 has an enlarged input end window 29. An input phosphor layer 30 is provided near the input window 29.

As noted above, this phosphor layer 30 is a single crystalline sheet, preferably a single crystal of cesium iodide molded to the desired substantially parabolic configuration. Because of its relative thickness and because the input phosphor is a unitary sheet rather than a series of particles bonded together by a plastic material or the like, and because of its relatively stable characteristics in vacuum, the input phopshor of this invention does not require the dishlike aluminum element used in the prior art.

Thus, of the four purposes of the aluminum dish described above, all but barring the entrance of light have been omitted. Obviously, the window 29 of the envelope 25 may be darkened if desired or the device may be used in a darkened room to prevent adverse effect on the image tube by ambient light.

Since the reasons for the aluminum dish are eliminated, it can be eliminated. With the present device, the input phosphor is supported by a mounting and support member in the form of a ring 32 at the perimeter of the input phosphor. The ring 32 may be supported by suitable studs 33, 34 suitably secured to the input window.

An electron-emissive layer 36 is provided. The electron-emissive layer 36 may be, as noted above, a trialkali. As disclosed, the unitary phosphor layer 30 and the electron-emissive layer 36 are shown separated by a suitable transparent barrier layer 37. As noted above, one may be able to omit the barrier layer with this particular combination of a single crystal cesium iodide input phosphor and a compatible electron-emissive layer, however, longest tube life appears to be assured by providing a very thin, clear, light transparent barrier layer of the plastic. Obviously, the manufacturing requirements for the barrier layer are considerably reduced as compared with the prior art because a flaw in the barrier layer will not result in the usually relatively abrupt tube failure which may be experienced with prior art barrier layers.

Electrons emitted by the emissive layer 36 are accelerated by an electrostatic field established by a conductive wall coating 38 on the interior of the envelope 25. This coating 38 accelerates and focuses the electrons through an anode thimble 39 onto an output phosphor 40. Light emitted by the output phosphor 40 is focused by the lens 13 onto the light amplifier 15 and results in an image in the monitor 23 in the manner described above.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In an image-forming device including an image intensification tube, *said tube including an evacuated envelope*, and *said device further including* means to reproduce an image output from said tube, an improved image tube input phosphor layer comprising:

a. a single crystalline sheet *of cesium iodide, said sheet being* of substantially uniform thickness *and being located within said evacuated envelope;* b. said sheet having the following physical properties:

i. photoluminescent and transparent to its own light;

ii. efficient in absorption of ray energy;

iii. of sufficient thickness and absorption to convert to light energy substantial percentages of gamma energy emanating from a source of energy of 250 kev. or less;

iv. of high resolution characteristics; and v. dish-shaped in configuration and focused to an accelerating electron field in said tube.

[2. The image device of claim 1 wherein said sheet is cesium iodide.]

3. The image device of claim 1 wherein said sheet is a single crystal.

[4. The image device of claim 1 wherein said sheet is a single crystal of cesium iodide.]

5. An image intensification tube responsive to stimulation by gamma energy or the like comprising:

a. an evacuated envelope having an input end and an output phosphor spaced therefrom;

b. a dish-shaped light-emissive layer near said input end and composed of a single crystalline sheet of photoluminescent material;

c. an electron-emissive layer deposited near an inner surface of said light-emissive layer such that light photons emitted by said light-emissive layer stimulate said electron-emissive layer and cause the latter layer to emit electrons;

d. means for accelerating electrons from said electron-emissive layer against said output phosphor;

e. said dish shape of said light-emissive layer and said electron layer being substantially contoured to the shape of an accelerating electron field produced by said acceleration means so as to be focused therewith, and f. a mounting means supporting said light-emissive layer and electron-emissive layer near said input end.

6. The tube of claim 5 wherein said photoluminescent material is a single crystal of cesium iodide.

7. The tube of claim 5 wherein said photoluminescent material is a single crystal.

8. The tube of claim 5 wherein said photoluminescent material is cesium iodide.

9. The tube of claim 5 wherein said photoluminescent material is of sufficient thickness to absorb about 30 percent of source energy of 150 kev. or less and is transparent to its own light.

10. The tube of claim 5 wherein said photoluminescent material can withstand temperatures of 300° F. without distortion or other degradation.

11. The tube of claim 5 wherein said mounting means is open at a central portion whereby entering energy passing through said central portion is not filtered or otherwise obstructed by said mounting means.

12. The method of forming an input gamma ray sensitive structure for an image intensification tube comprising the steps of:

a. heat softening a single crystal of cesium iodide;

b. molding the single crystal of cesium iodide while heat softened to a dish-shaped configuration having a concave output surface to form a photoemissive layer;

c. depositing an electron-emissive layer on the output dish of said formed dish-shaped cesium iodide crystal with the electron layer and crystal in sufficiently close juxtaposition that light energy emitted by the crystal stimulates said electron-emissive layer and causes the emission of electrons when in use; and d. securing a mounting means to the periphery of said photoemissive layer and mounting said layers in an envelope with the convex surface of the photoemissive layer oriented toward an input end of said envelope.

13. The method of claim 12 wherein the depositing steps is on a barrier layer and including the step of providing a barrier layer between the electron-emissive layer and the crystal.

*14. The image-forming device of claim 1 wherein said sheet is of sufficient thickness to absorb approximately thirty percent of source energy at 150 kev. or less.*

* * * * *

Dedication

Re. 28,751.—*Jack Ball*, Chesterland, Ohio. X- AND GAMMA-RAY SENSITIVE IMAGE INTENSIFICATION TUBE. Patent dated Mar. 30, 1976. Dedication filed June 23, 1980, by the assignee, *Varian Associates, Inc.*

Hereby dedicates to the Public all claims of said patent.

[*Official Gazette September 9, 1980.*]